July 7, 1936.  W. J. BAUM ET AL  2,046,806
BRAKE
Filed Nov. 5, 1934   3 Sheets-Sheet 1

Inventors
William J. Baum.
William O. Wilson.
By Lacey & Lacey, Attorneys

July 7, 1936. W. J. BAUM ET AL 2,046,806
BRAKE
Filed Nov. 5, 1934  3 Sheets-Sheet 2
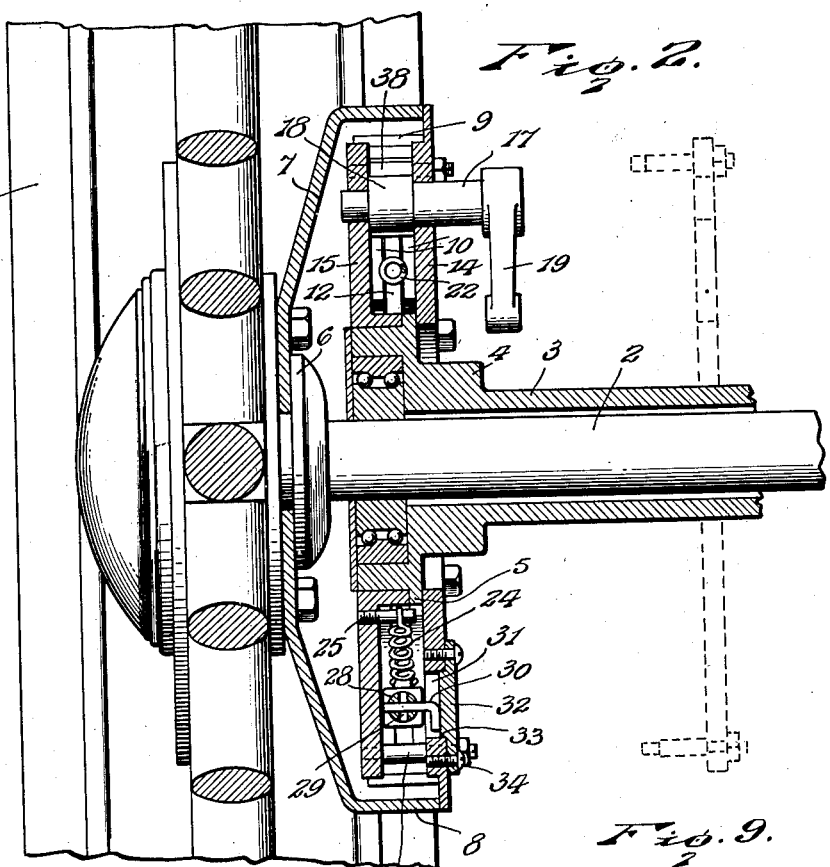
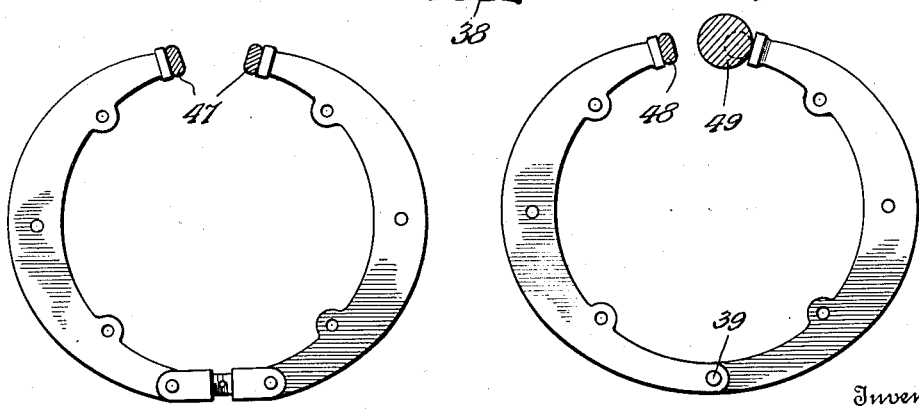
Inventors
William J. Baum.
William O. Wilson.
By Lacey & Lacey, Attorneys July 7, 1936.  W. J. BAUM ET AL  2,046,806
BRAKE
Filed Nov. 5, 1934  3 Sheets-Sheet 3
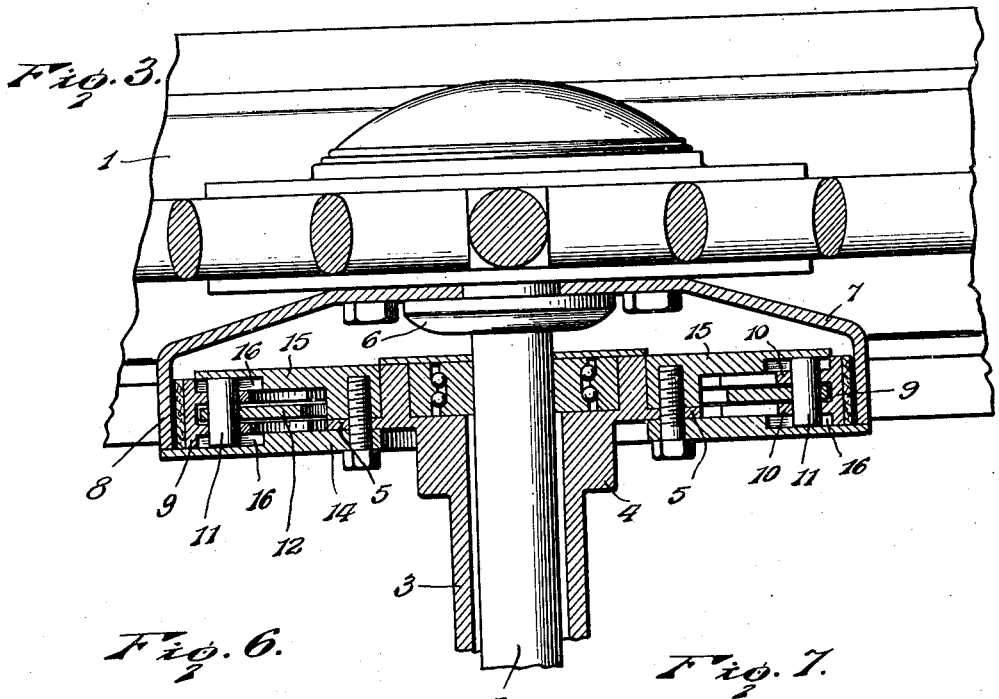
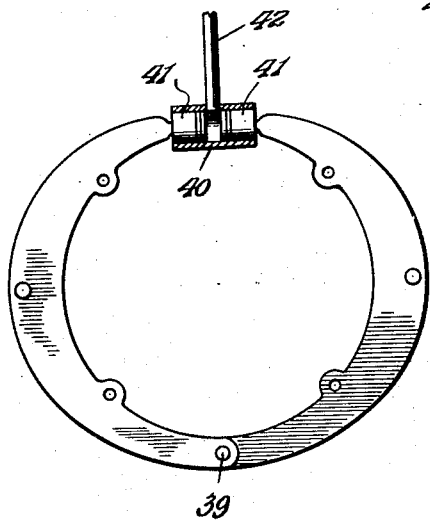
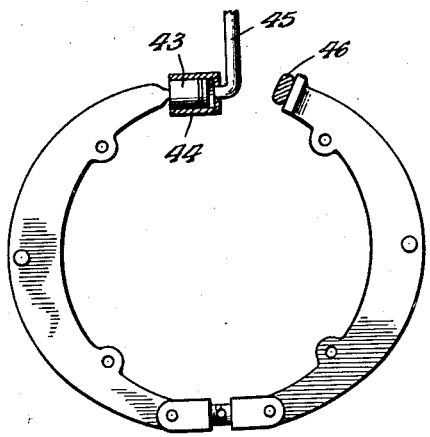
Inventors
William J. Baum.
William O. Wilson.
By Lacey & Lacey, Attorneys Patented July 7, 1936

2,046,806

UNITED STATES PATENT OFFICE 2,046,806

BRAKE

William J. Baum and William O. Wilson,
Jackson, Tenn.

Application November 5, 1934, Serial No. 751,606

4 Claims. (Cl. 188—78)

This invention relates to brakes and has for its object the provision of a quick setting self centralizing brake by the use of which a vehicle may be quickly stopped, a particular object being to provide a brake in which the brake shoes will be centrally mounted so as to be applied to the brake drum with equal force throughout their extent and to be actuated by levers so mounted that the full force of the same will be utilized in applying the brake. The invention is illustrated in the accompanying drawings and consists in certain novel features which will be hereinafter first fully described and then more particularly defined in the appended claims.

In the drawings:

Figure 2 is a vertical section on the line 2—2 of Figure 1.

Figure 3 is a horizontal section on the line 3—3 of Figure 1.

Figures 6, 7, 8 and 9 show variations in the mounting and operation of the brake levers.

Figure 1:
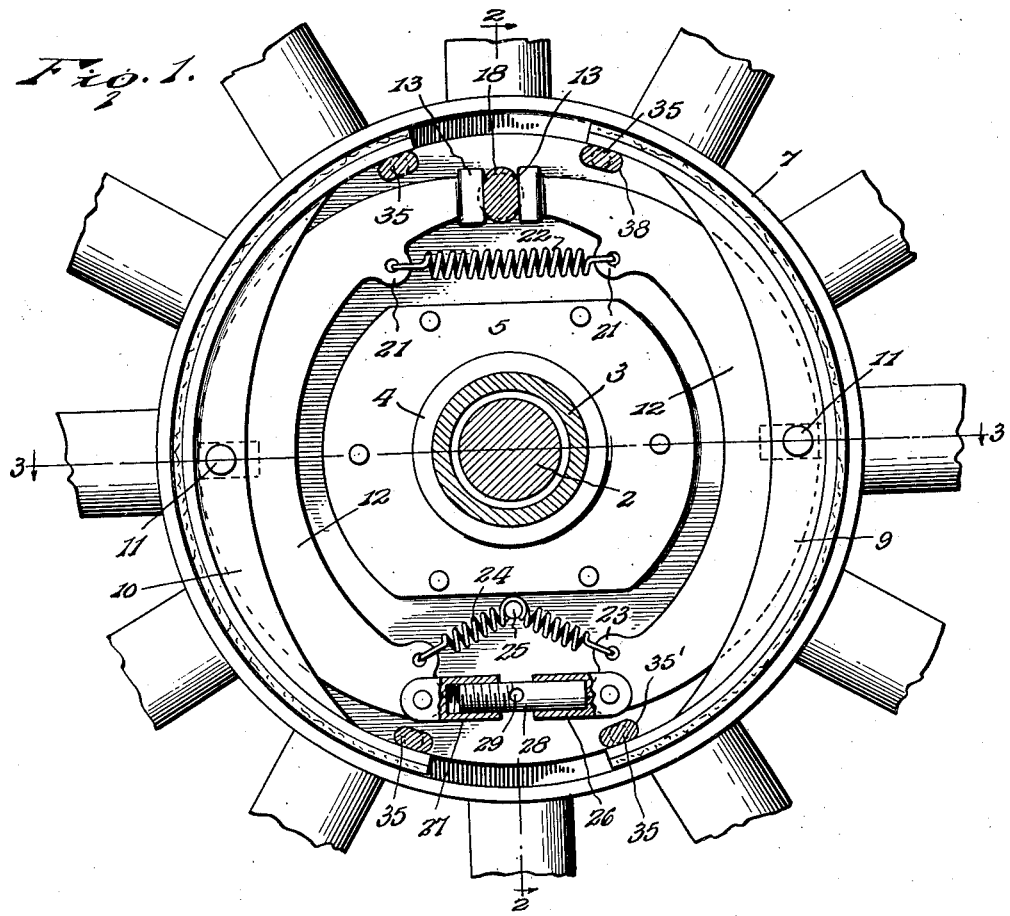
Figure 1 is an elevation, partly in section, with the inner plate removed, of a brake embodying the invention.
Figure 4:
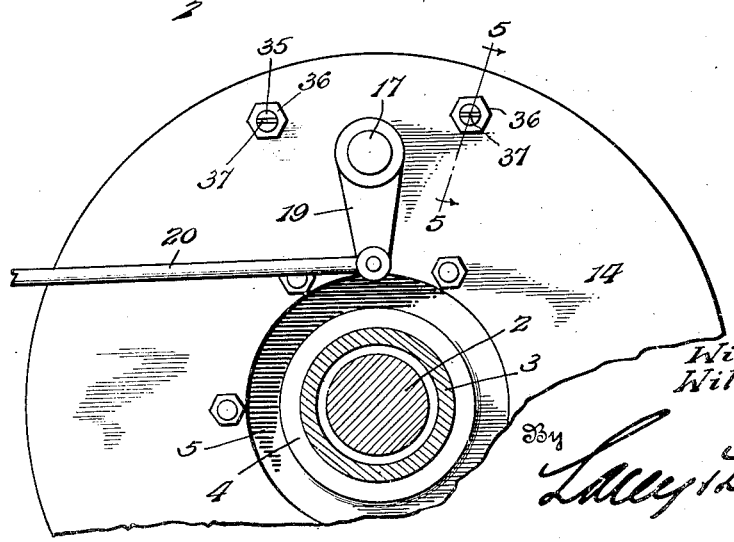
Figure 4 is a detail elevation with parts in section.
Figure 5:
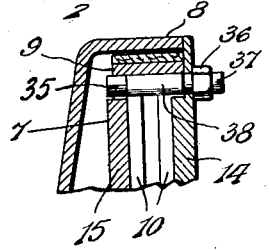
Figure 5 is a detail section on the line 5—5 of Figure 4.

In the drawings, we have illustrated an automobile wheel at 1 carried by an axle 2 which is mounted within an axle housing 3. In carrying out our invention, the axle housing is provided near its outer end with an enlargement 4 and an annular flange 5 on said enlargement, and adjacent the wheel is provided with a collar or flange 6 against which the brake drum 7 bears, the drum being secured to the wheel, as clearly shown in Figures 2 and 3. The brake drum may be of any approved form and comprises a rim member 8 against which the brake shoes act when applying the brake. The brake shoes 9 are of arcuate form and are disposed at diametrically opposite points of the drum and adapted to bear against the inner circumference of the drum when in action. Each brake shoe is provided with spaced longitudinal ribs 10 and midway the ends of these ribs a pin 11 is fitted therethrough and through a brake lever 12 which is disposed between the ribs 10, as shown in Figure 3. A pair of brake levers is provided and they are somewhat V-shaped in elevation with their upper ends opposed near the top of the brake drum, said ends being provided with plane bearing faces, as shown at 13. At opposite sides of the brake shoes and the flange 5 on the axle housing are carrying plates 14 and 15 and these plates are provided in their inner opposed faces with grooves 16 in which the ends of the pins 11 are slidably engaged so as to be guided by the grooves in applying or releasing the brake shoes. The plates 14 and 15 are bolted to the flange 5 of the housing 3 and in the upper portions of said plates a rock shaft 17 is journaled, said shaft being provided with a cam 18 between the plates bearing against the plane ends of the brake levers. A crank arm 19 is secured on the inner free end of the rock shaft and a brake rod 20 is pivoted to the lower end of said crank and extends forwardly to some point upon the vehicle where it is attached to an operating lever in the usual manner to be manipulated by the operator. The brake levers are provided with perforated lugs or ears 21 near their upper ends, and a contractile spring 22 has its ends engaged in said lugs or ears and tends constantly to hold the levers in retracted position against the cam 18, as will be understood upon reference to Figure 1. Near their lower ends, the brake levers are provided with similar perforated lugs or ears 23 and retractile springs 24 are engaged in the respective lugs and supported between their ends by a pin 25 secured in the outer carrying plate 15. The lower extremities of the brake levers have pivoted thereto clevises or sockets 26, 27, the bore of the socket or clevis 26 being smooth, while the bore of the socket 27 is threaded, and engaged in said sockets is a bolt or rod 28, one end of which is smooth and the other end of which is threaded and engaged in the threaded socket, as shown clearly in Figure 1, whereby rotation of the bolt will cause the sockets to approach or recede and thereby adjust the levers to operate properly. The bolt or rod 28 is provided with diametrical openings 29 in which a pin 30 may be engaged to adjust the bolt, the inner carrying plate 14 being provided with an opening 31 through which the pin may be inserted and manipulated to adjust the bolt in an obvious manner. A cover plate 32 is provided and has a boss 33 on its inner side which will fit closely within the opening 31 so that the access of dirt to the pin will be prevented and the pin will be held against turning so as to maintain the set position of the bolt or rod. As shown in Figure 2, the cover plate 32 is secured upon the carrying plate 14 by screws 34 and when in place will bear against the cranked end of the pin 30 so that it will be held against turning.

Rests are provided for the brake shoes and are illustrated as in the form of pins 35 extending across the housing defined by the carrying plates 14, 15 and having their ends movably mounted in said plates. The pins, between the plates, are formed into cams 38 against which the ends of the shoes bear, slots 37 being formed in ends of the pins to receive a screwdriver or similar tool for adjusting the pins and nuts 36 being turned home against the plate 14 for holding the adjustment. It will be readily understood that by turning the pins, the cam portions thereof will be set closer to or farther from the brake shoes and, consequently, the brake shoes will be held more or less closely to the brake drum. By properly adjusting the pins, compensation for wear upon the brake shoes or their facings will be accomplished. It will be readily noted that one of these pins is provided at each end of each brake shoe and the movement of the brake shoes away from the drum is thus limited, and the shoes will be carried by the pins when unapplied. In assembling the parts, the shoes are adjusted so that they are out of contact with the brake drum but close thereto and the brake levers are then properly positioned relative to the shoes so that a very slight movement of the actuating cam 18 will apply the brake shoes firmly against the brake drum to arrest the rotation of the wheel.

The brake levers may be connected at their lower ends in various ways and in Figures 6 and 9 we have shown them pivoted directly to each other by a pivot pin 39, Figures 7 and 8 showing them connected by the bolt and socket arrangement illustrated in Figure 1 and previously particularly described.

The levers may be swung apart by various instrumentalities and in Figure 6 we have shown a cylinder 40 disposed between the upper opposed ends of the levers and pistons 41 mounted slidably in the cylinder and bearing against the ends of the respective levers, a pipe 42 entering the cylinder between its ends so that fluid pressure may be applied to the pistons to move them apart and, consequently, rock the levers to apply the brake shoes against the brake drum. In Figure 7 we have shown one brake lever connected to a piston 43 mounted in a cylinder 44 with a fluid pressure pipe 45 leading into the cylinder to operate the piston. The other lever is shown as operated by a flat-sided cam 46 similar to the cams 18 and 38 heretofore described. We have shown the levers in Figure 8 operated by separate cams 47 corresponding in all respects to the cam 46, and it will be understood that suitable connections with the brake rod will be provided so that these cams may be rocked simultaneously. In Figure 9 we have shown a flat-sided cam 48 bearing against the end of one brake lever and an eccentric 49 bearing against the end of the other brake lever.

From the foregoing description, taken in connection with the accompanying drawings, it will be readily seen that normally the brake levers are held retracted or toward each other by the several springs and the brake shoes will be out of contact with the brake drum. When the cam 18 is rocked the upper ends of the levers will be spread apart in opposition to the retractile springs and the brake shoes will then be moved into contact with the brake drum so as to arrest the rotation of the wheel. It will be readily noted that the shoes and levers are so mounted that they will be self-centralizing and the pressure will be applied to both brake shoes equally so that the wear upon the opposed friction surfaces will be equally distributed. The pins may be adjusted without disassembling any of the parts and if further adjustment is needed merely temporarily removing the cover plate 32 will afford access to the pin 30 so that the necessary rotation of the bolt or rod 28 may be effected. If further adjustment is needed or it should become necessary to replace some of the parts or reface some of the brake shoes, removing the bolts which secure the inner carrying plate 14 will permit said plate to be moved outwardly along the axle housing and supported thereon, as indicated by the dotted lines in Figure 2. The rock shaft 17 with the crank arm 19 may be moved with the carrying plate, the brake rod 20, of course, being disconnected. It will thus be seen that any necessary repairs or adjustments to the working parts may be accomplished without requiring removal of the vehicle wheel from the axle and the work and the jacking up of the axle incident to such procedure. Inasmuch as the brake levers are mounted at their centers upon the shoes and apply their force to the centers of the shoes, the brake power is more evenly distributed and more effectually utilized than in other forms of brakes.

Having thus described the invention, what is claimed as new is:

1. A brake mechanism comprising a brake drum having an open side, an axle housing facing the open side of the drum, carrying plates secured to said housing at the inner open side of the drum, brake shoes supported by and between said carrying plates adjacent the drum, brake levers disposed between the plates and pivotally mounted at their lower ends and engaged centrally with the brake shoes, and means carried by said plates and engaged between upper ends of the levers to expand the levers and apply the shoes to the drum.

2. A brake mechanism comprising a brake drum, a rotating part to which the drum is attached, a relatively stationary part disposed axially of the drum, carrying plates removably secured upon said stationary part within the drum at the open side of the same, brake shoes mounted between said carrying plates, brake levers disposed between the plates and engaged with the brake shoes at the centers thereof, said brake levers being connected at their lower ends and separated at their upper ends, retractile springs engaged with and extending between the levers to hold them normally retracted, and an operating element mounted between the upper ends of the levers to spread the same and apply the brake shoes to the brake drum.

3. A brake mechanism comprising a brake drum, carrying plates disposed within the brake drum at the open side of the same, said plates having radial grooves in their opposed faces, brake shoes arranged adjacent the brake drum and having projections on their inner sides extending between the carrying plates, brake levers having their central portions disposed between the projections on the brake shoes, pins engaged through the brake levers and said projections with their ends slidably engaged in the guiding grooves in the carrying plates, yieldable means engaged with the brake levers to hold them normally retracted and the brake shoes out of contact with the brake drum, and means for spreading the brake levers and applying the brake shoes to the drum.

4. A brake mechanism comprising a brake drum open at one side, a stationary axle housing disposed axially of the drum, inner and outer carrying plates removably secured to and carried solely by said axle housing, said axle housing having a flange clamped between the plates and constituting a spacer for the plates, the outer plate having marginal portions bearing against walls of the drum and closing the open end of the drum, brake shoes mounted between the plates, and means between the plates for operating the brake shoes, the carrying plate remote from the drum being shiftable along the support to expose the shoes and operating means.

WILLIAM J. BAUM.
WILLIAM O. WILSON.